United States Patent
Sato et al.

(10) Patent No.: US 9,208,427 B2
(45) Date of Patent: Dec. 8, 2015

(54) CONTACTLESS COMMUNICATION MEDIUM, ANTENNA PATTERN ARRANGEMENT MEDIUM, COMMUNICATION APPARATUS, AND COMMUNICATION METHOD

(75) Inventors: Keisuke Sato, Miyagi (JP); Sachio Saitoh, Miyagi (JP)

(73) Assignee: SONY CORPORATION, Tokyo (JP)

( * ) Notice: Subject to any disclaimer, the term of this patent is extended or adjusted under 35 U.S.C. 154(b) by 317 days.

(21) Appl. No.: 13/068,048

(22) Filed: Apr. 29, 2011

(65) Prior Publication Data

US 2011/0298574 A1 Dec. 8, 2011

(30) Foreign Application Priority Data

May 10, 2010 (JP) ................................ P2010-108803

(51) Int. Cl.
| | | |
|---|---|---|
| *H01F 38/14* | (2006.01) | |
| *G06K 19/077* | (2006.01) | |
| *H01Q 1/22* | (2006.01) | |
| *H01Q 23/00* | (2006.01) | |

(52) U.S. Cl.
CPC .... *G06K 19/07756* (2013.01); *G06K 19/07771* (2013.01); *H01Q 1/2208* (2013.01); *H01Q 23/00* (2013.01)

(58) Field of Classification Search
CPC ................. G06K 19/07756; G06K 19/07771; H01Q 1/2208; H01Q 23/00
USPC .................... 235/492, 493; 340/572.7, 572.8; 343/700 MS, 720, 741, 788, 841–842, 343/866, 895; 455/41.1; 336/84 C
See application file for complete search history.

(56) References Cited

U.S. PATENT DOCUMENTS

| | | | | |
|---|---|---|---|---|
| 3,509,573 | A * | 4/1970 | Balmain ..................... | 343/792.5 |
| 5,940,043 | A * | 8/1999 | Canipe et al. ................ | 343/742 |
| 5,986,562 | A * | 11/1999 | Nikolich .................... | 340/693.5 |
| 7,088,304 | B2 * | 8/2006 | Endo et al. .................... | 343/788 |
| 7,154,449 | B2 * | 12/2006 | Liu et al. ..................... | 343/867 |
| 7,262,680 | B2 * | 8/2007 | Wang ............................ | 336/200 |
| 7,306,163 | B2 * | 12/2007 | Scholz et al. ................ | 235/492 |
| 7,498,948 | B1 * | 3/2009 | Gudeman et al. .......... | 340/572.8 |

(Continued)

FOREIGN PATENT DOCUMENTS

| | | |
|---|---|---|
| JP | 9286188 | 11/1997 |
| JP | 2006053653 A | 2/2006 |

(Continued)

OTHER PUBLICATIONS

Office Action from Japanese Application No. 2010-108803, dated Oct. 29, 2013.

*Primary Examiner* — Benjamin C Lee
*Assistant Examiner* — Stephen Burgdorf
(74) *Attorney, Agent, or Firm* — Hazuki International, LLC (57) ABSTRACT

A contactless communication medium includes: a base material made of an insulating material; an antenna coil portion formed by winding a conductor in a plane on the base material; a capacitor connected to the antenna coil portion; a communication processing section connected to the antenna coil portion and the capacitor to perform a contactless communication process; and a metal pattern having a predetermined area and disposed in a region surrounded by the antenna coil portion, the metal pattern being not electrically connected to the antenna coil portion or the capacitor.

11 Claims, 11 Drawing Sheets

(56) References Cited

U.S. PATENT DOCUMENTS

| | | | |
|---|---|---|---|
| 7,503,491 B2* | 3/2009 | Zhu et al. | 235/451 |
| 7,990,326 B2* | 8/2011 | Nakamura et al. | 343/742 |
| 8,432,283 B2* | 4/2013 | Hoyt et al. | 340/572.1 |
| 2003/0169153 A1* | 9/2003 | Muller | 340/10.51 |
| 2005/0092836 A1* | 5/2005 | Kudo | 235/436 |
| 2005/0212707 A1* | 9/2005 | Egbert et al. | 343/702 |
| 2007/0001921 A1* | 1/2007 | Takahashi et al. | 343/788 |
| 2007/0069961 A1* | 3/2007 | Akiho et al. | 343/702 |

FOREIGN PATENT DOCUMENTS

| | | |
|---|---|---|
| JP | 2007-102348 A | 4/2007 |
| JP | 2007304910 A | 11/2007 |

\* cited by examiner

CONTACTLESS COMMUNICATION MEDIUM, ANTENNA PATTERN ARRANGEMENT MEDIUM, COMMUNICATION APPARATUS, AND COMMUNICATION METHOD

CROSS-REFERENCE TO RELATED APPLICATION

The present application claims priority from Japanese Patent Application No. JP 2010-108803 filed in the Japanese Patent Office on May 10, 2010, the entire content of which is incorporated herein by reference.

BACKGROUND OF THE INVENTION

1. Field of the Invention

The present invention relates to a contactless communication medium that performs contactless wireless communication with a reader/writer in proximity, an antenna pattern arrangement medium provided in the contactless communication medium, a communication apparatus incorporating the contactless communication medium, and a communication method for contactless wireless communication.

2. Description of the Related Art

So-called contactless IC cards are commonly used as a contactless communication medium that performs contactless wireless communication with a reader/writer in proximity. The contactless IC cards are widely used, for example, for ticket examination systems in railway stations, payment systems in convenience stores and so forth, room entry/exit systems, and so forth. The contactless IC cards are also referred to as RFID (Radio Frequency Identification) tags or wireless IC tags.

Such a contactless IC card includes an IC chip embedded inside the card, which allows quick reaction and processing for room entry/exit and billing management, and thus enhances the convenience of the card compared to a magnetic card.

Figure 11A:
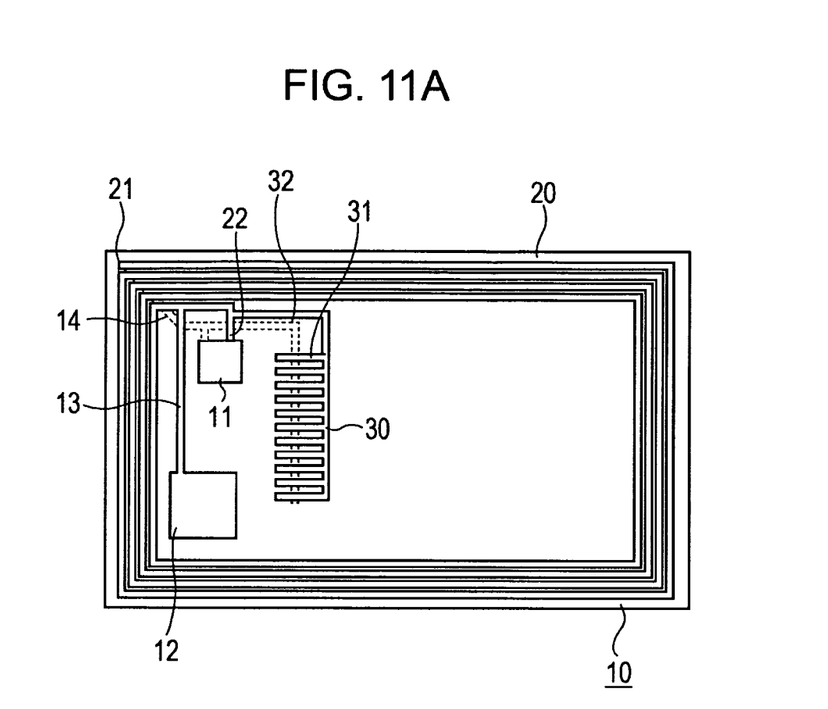
FIG. 11A is a plan view showing an exemplary configuration of a contactless IC card according to the related art.
Figure 11B:
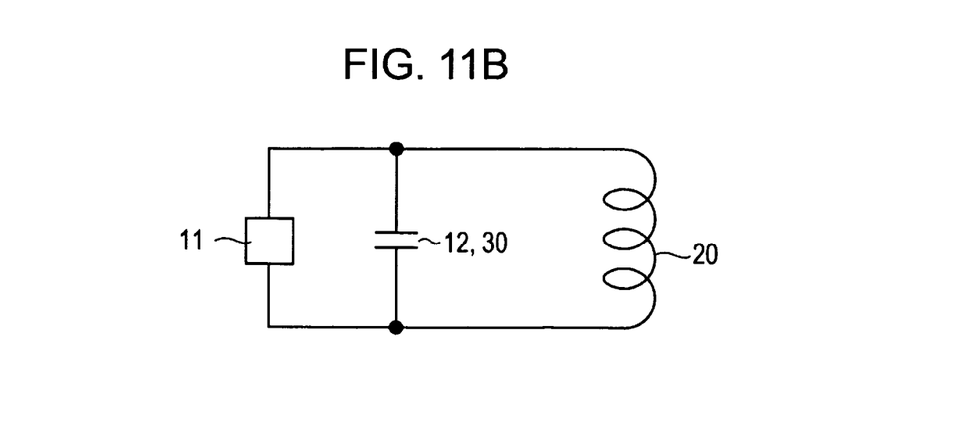
FIG. 11B shows a circuit that is equivalent to the configuration of the contactless IC card of FIG. 11A.

FIGS. 11A and 11B show an exemplary configuration of a contactless IC card according to the related art. FIG. 11A shows a circuit for contactless communication disposed on a resin base material. In a contactless IC card as an actual product, the circuit is concealed by an outer shell material such as a film disposed on the front surface of the card.

The configuration shown in FIG. 11A is described. An antenna coil portion 20 is disposed on the front surface of a base material 10 close to the outer periphery of the base material 10. The antenna coil portion 20 is formed by winding a conductor pattern made of a conductor such as copper or aluminum and having a constant width in a plurality of turns (in the example, four turns) at constant intervals on the surface of the base material 10 close to the outer periphery of the base material 10.

A first end portion 21 and a second end portion 22 of the antenna coil portion 20 are connected to an IC chip 11 serving as an integrated circuit component that performs a communication process. In this case, the first end portion 21 of the antenna coil portion 20 is led to the back surface of the base material 10 to be connected to the IC chip 11, which performs a communication process, via a conductor pattern 14 provided on the back surface. The second end portion 22 of the antenna coil portion 20 is connected to the IC chip 11 via a conductor pattern 13.

The first end portion 21 and the second end portion of the antenna coil portion 20 are also connected to a capacitor 12 and an adjustment capacitor 30. The first end portion 21 of the antenna coil portion 20 is connected to the capacitor 12 and the adjustment capacitor 30 also via the conductor pattern 14 provided on the back surface.

The capacitor 12 accumulates charge generated by a carrier wave received by the antenna coil portion 20 to obtain electric power for driving the IC chip 11, and includes a first electrode portion formed by a conductor pattern provided on the front surface and a second electrode portion formed by a conductor pattern provided on the back surface. The capacitor 12 accumulates charge with the first electrode portion and the second electrode portion, which face each other via the base material 10. Each of the electrode portions forming the capacitor 12 has a relatively large area so as to be able to accumulate a relatively large amount of charge.

The adjustment capacitor 30 is configured to change the resonant frequency. The adjustment capacitor 30 includes a first conductor pattern 31 provided on the front surface and connected to the second end portion 22 of the antenna coil portion 20 and a second conductor pattern 32 provided on the back surface and connected to the conductor pattern 14. The first conductor pattern 31 provided on the front surface is formed to include comb-teeth conductor patterns. The second conductor pattern 32 provided on the back surface is formed to orthogonally intersect the comb-teeth portions. Charge is accumulated at each of the intersections. The adjustment capacitor 30 has a small capacitance compared to the capacitor 12. The adjustment capacitor 30 increases the resonant frequency by cutting off some of the comb-teeth conductor patterns to reduce the condenser capacitance during adjustment of the resonant frequency in a contactless IC card manufacturing process.

FIG. 11B shows a circuit that is equivalent to the configuration of the contactless IC card shown in FIG. 11A.

As shown in FIG. 11B, the IC chip 11 and the capacitor 12 and the adjustment capacitor 30 are connected in parallel with the antenna coil portion 20.

The adjustment process for increasing the resonant frequency using the adjustment capacitor 30 is performed by cutting off portions of the first conductor pattern 31 and the second conductor pattern 32. In the process, for example, a hole is formed in the base material 10 at a point at which the first conductor pattern 31 is cut, and the first conductor pattern 31 and the second conductor pattern 32 are removed.

The resonant frequency adjustment process in the manufacturing process is performed automatically using an adjustment device (not shown). That is, the adjustment device is provided with data on a cutting position for correcting the resonant frequency of a communication medium in advance, and performs adjustment by determining a cutting position on the basis of a resonant frequency obtained through actually measurement and forming a hole in a base material at the determined position. By performing the adjustment, a contactless IC card with an appropriate resonant frequency is obtained.

Figure 12A:
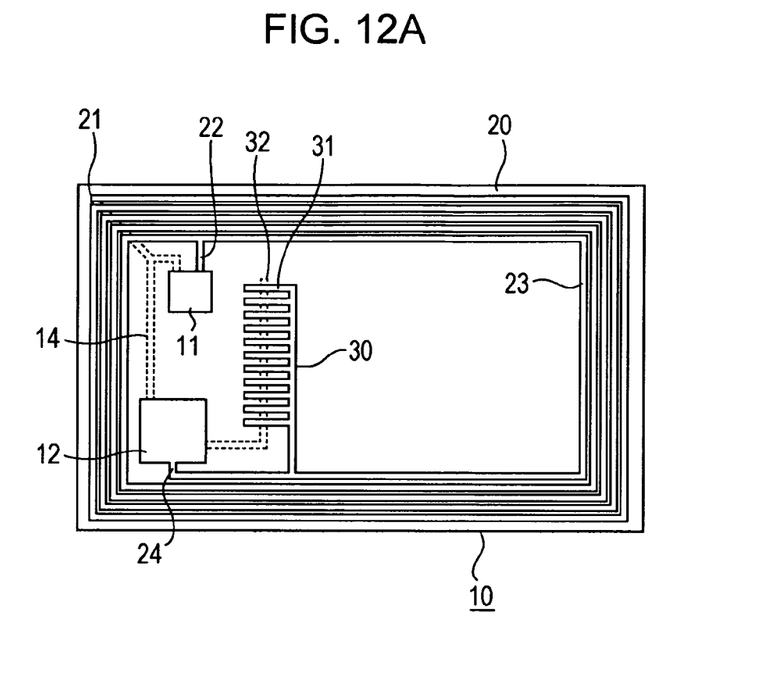
FIG. 12A is a plan view showing another example (an example with an intermediate tap) of the contactless IC card according to the related art.
Figure 12B:
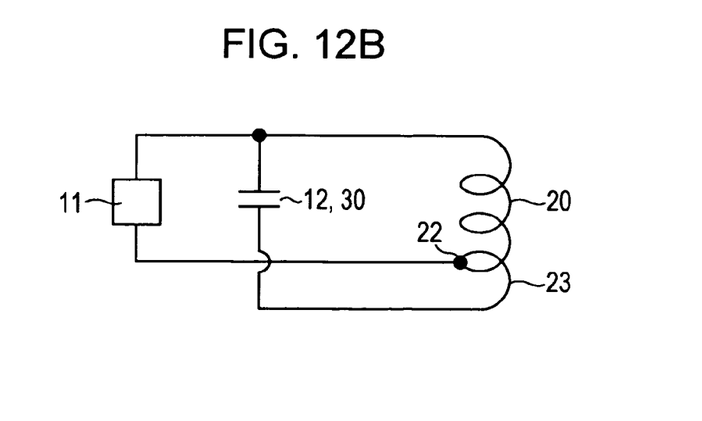
FIG. 12B shows a circuit that is equivalent to the configuration of the contactless IC card of FIG. 12A.

FIGS. 12A and 12B show an exemplary configuration of a contactless IC card, which is different from the example of FIGS. 11A and 11B, with an intermediate tap.

The configuration shown in FIG. 12A is described. An antenna coil portion 20, which is formed by winding a conductor pattern in a plurality of turns, is disposed on the front surface of a base material 10 close to the outer periphery of the base material 10. A first end portion 21 and a second end portion 22 of the antenna coil portion 20 are connected to an IC chip 11 serving as an integrated circuit component that performs a communication process. The first end portion 21 of the antenna coil portion 20 is connected to the IC chip 11, which performs a communication process, via a conductor pattern 14 provided on the back surface.

The capacitor 12 is connected to the first end portion 21 of the antenna coil portion 20 on the back surface, and to an end portion 24 of an antenna extension portion 23 extending from the second end portion 22 of the antenna coil portion 20 on the front surface.

Regarding the adjustment capacitor 30, the second conductor pattern 32 provided on the back surface is connected to the conductor pattern 14 provided on the back surface, and the first conductor pattern 31 provided on the front surface is connected to the end portion 24 provided on the front surface.

FIG. 12B shows a circuit that is equivalent to the configuration of the contactless IC card shown in FIG. 12A.

As shown in FIG. 12B, the IC chip 11 is connected to the antenna coil portion 20, and the capacitor 12 and the adjustment capacitor 30 are connected to the antenna coil portion 20 via the antenna coil portion 20 and the extension portion 23. The second end portion 22, at which the antenna coil portion 20 and the extension portion 23 are connected to each other, serves as an intermediate tap. The adjustment process performed using the adjustment capacitor 30 is the same as the example of FIGS. 11A and 11B.

In the case of the configuration shown in FIGS. 12A and 12B, adjustment performed using the adjustment capacitor 30 makes it possible to change the overall inductance value without changing the inductance value of components connected to the IC chip 11.

Japanese Unexamined Patent Application Publication No. 2007-102348 discloses an RFID tag in which a dummy pattern is provided outside an antenna coil.

SUMMARY OF THE INVENTION

While some cellular phone terminals incorporate a contactless IC card that provides an electronic money function or the like, there are a large number of cellular phone terminals and portable music players that do not have an electronic money function, and there is a great desire to add an electronic money function to such cellular phone terminals and portable music players. Therefore, in order to conveniently provide an IC card function to the cellular phone terminals, casings that are capable of storing an IC card and that match the housing of a terminal are currently commercially available. With such casings, however, the IC card is merely placed in close proximity to the cellular phone terminal, which may increase the thickness and the volume of the terminal to deteriorate the usability for users. In addition, the contactless IC cards themselves are designed and manufactured on the assumption of use in a free space (an environment in which there is no metal or the like in proximity), and therefore the presence of any housing for a cellular phone terminal or the like that contains metal in proximity may significantly reduce the communication distance.

According to the related art, it is conceived to provide a magnetic sheet between an electronic device and a contactless IC card affixed to the housing of the electronic device in order to satisfy the communication characteristics of the card, which enables improvement in communication distance. Even if the communication distance is improved, however, there may be a region in which communication may not be performed (hereinafter referred to as a communication dead zone) depending on the combination between a reader/writer and a contactless IC card (contactless communication medium).

In view of the foregoing, it is desirable to eliminate a communication dead zone in communication performed between a contactless communication medium and a reader/writer.

According to an embodiment of the present invention, there is provided a contactless communication medium including: a base material made of an insulating material; an antenna coil portion formed by winding a conductor in a plane on the base material; a capacitor connected to the antenna coil portion; and a communication processing section connected to the antenna coil portion and the capacitor to perform a contactless communication process.

The contactless communication medium additionally includes a metal pattern having a predetermined area and disposed in a region surrounded by the antenna coil portion, the metal pattern being not electrically connected to the antenna coil portion or the capacitor.

With the metal pattern, which has a predetermined area and which is not electrically connected to the antenna coil portion or the capacitor, disposed in a region surrounded by the antenna coil portion, it is possible to eliminate a communication dead zone without changing the maximum distance over which communication with a reader/writer may be made.

According to the present invention, with the metal pattern disposed in a region surrounded by the antenna coil portion, it is possible to eliminate a communication dead zone without changing the maximum distance over which communication with a reader/writer may be made. This allows to favorably perform contactless wireless communication with the reader/writer in the case where the contactless communication medium is affixed to the housing of an electronic device, for example.

DESCRIPTION OF THE PREFERRED EMBODIMENTS

An embodiment of the present invention will be described in the following order.

1. Exemplary Configuration of Medium according to Embodiment (FIGS. 1A, 1B, and 2)
2. Exemplary Overall Configuration (FIGS. 3 and 4)
3. Characteristics of Medium according to Embodiment (FIG. 5)
4. First Modification (FIG. 6)
5. Second Modification (FIGS. 7, 8A, and 8B)
6. Third Modification (FIGS. 9, 10A, and 10B)
7. Other Modifications

[1. Exemplary Configuration of Medium According to Embodiment]

The configuration of a contactless IC card according to an embodiment will be described below with reference to FIGS. 1A, 1B, and 2. In the embodiment, a conductor pattern to be discussed below is disposed on a base material formed by a resin sheet to form an antenna coil arrangement medium, to which components such as an IC chip are attached to form a contactless communication medium 110. As discussed later, the contactless communication medium 110 is completed as a contactless IC card by disposing other sheets and so forth on the front and rear sides of the base material.

Figure 1A:
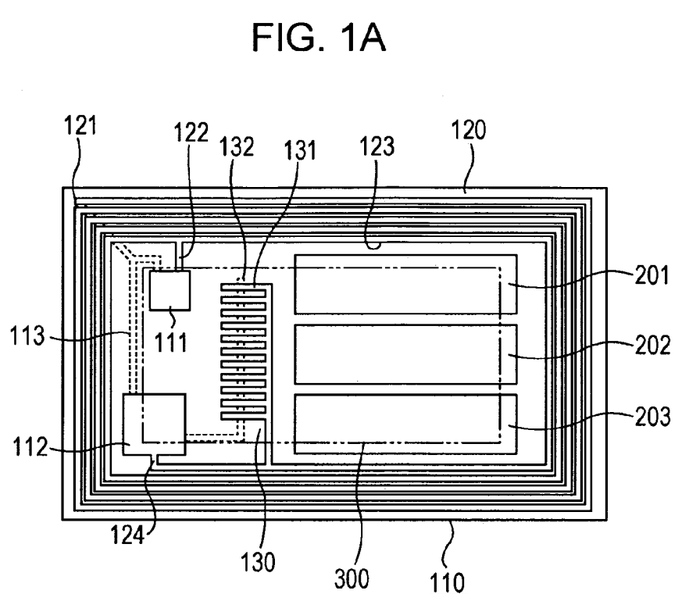
FIG. 1A is a plan view showing an exemplary configuration of a contactless communication medium according to an embodiment of the present invention.

FIG. 1A is a plan view showing the front surface of the contactless communication medium 110. FIG. 2 shows a front surface 110a and a back surface 110b of the contactless communication medium 110. It should be noted, however, that the back surface 110b shown in FIG. 2 is as seen from the front side to facilitate understanding the correspondence with the front surface 110a. Thus, the back surface 110b as actually seen from the back side is vertically inverted from that shown in FIG. 2.

Figure 2:
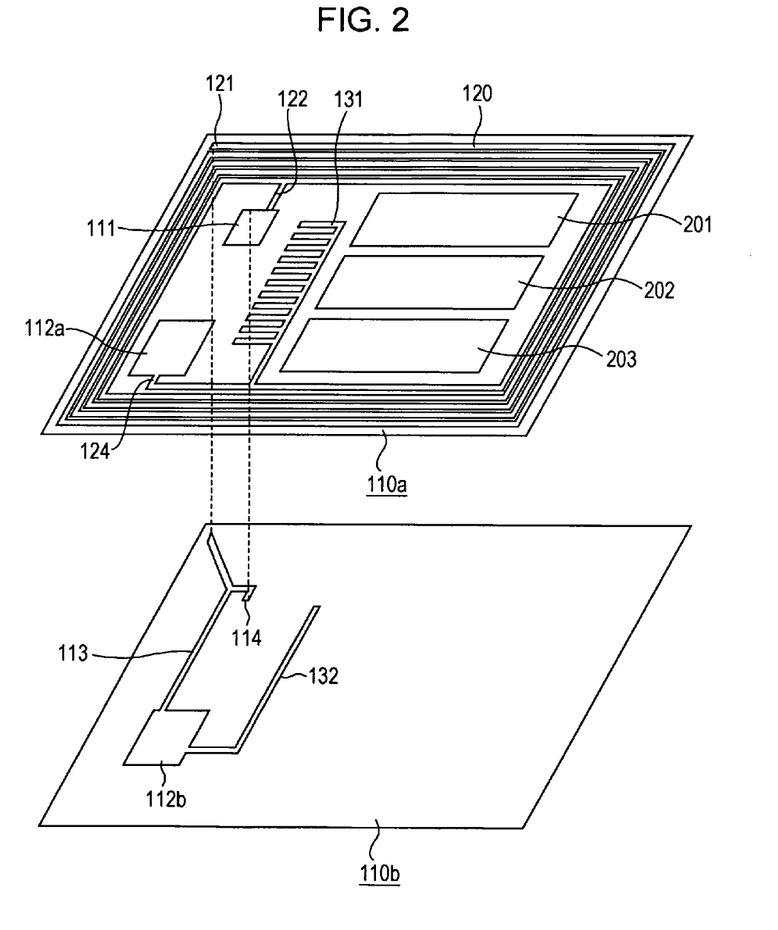
FIG. 2 is a perspective view showing the front surface and the back surface of the contactless communication medium according to the embodiment of the present invention.

As shown in FIGS. 1A and 2, the contactless communication medium 110 is formed by a rectangular base material that is similar to various types of cards, and an antenna coil portion 120 is disposed on the front surface of the contactless communication medium 110 close to the outer periphery of the contactless communication medium 110. The antenna coil portion 120 is formed by winding a conductor pattern made of a conductor such as copper or aluminum and having a constant width in a plurality of turns (in the example, about four turns) on the front surface 110a of the contactless communication medium 110 close to the outer periphery of the contactless communication medium 110.

A first end portion 121 and a second end portion 122 of the antenna coil portion 120 are connected to an IC chip 111 serving as an integrated circuit component that performs a communication process. In this case, the first end portion 121 of the antenna coil portion 120 is led to the back surface of the base material to be connected to the IC chip 111, which performs a communication process, via a conductor pattern 113 provided on the back surface. As shown in FIG. 2, the conductor pattern 113 provided on the back surface is led from the back surface to the front surface of the base material at an IC chip connection point 114 to be connected to the IC chip 111. The second end portion 122 of the antenna coil portion 120 is directly connected to the IC chip 111.

The first end portion 121 and the second end portion 122 of the antenna coil portion 120 are also connected to a capacitor 112 and an adjustment capacitor 130. The capacitor 112 is connected to the first end portion 121 of the antenna coil portion 120 via the conductor pattern 113 on the back surface of the base material, and to an end portion 124 of an antenna extension portion 123 extending from the second end portion 122 of the antenna coil portion 120 on the front surface.

The capacitor 112 accumulates charge generated by a carrier wave received by the antenna coil portion 120 to obtain electric power for driving the IC chip 111. As shown in FIG. 2, the capacitor 112 includes a first electrode portion 112a formed by a conductor pattern provided on the front surface and a second electrode portion 112b formed by a conductor pattern provided on the back surface. The capacitor 112 accumulates charge with the first electrode portion 112a and the second electrode portion 112b, which face each other via the base material. Each of the electrode portions 112a and 112b forming the capacitor 112 has a relatively large area so as to be able to accumulate a relatively large amount of charge.

The adjustment capacitor 130 is configured to change the resonant frequency. As shown in FIG. 2, the adjustment capacitor 130 includes a first conductor pattern 131 provided on the front surface and connected to the second end portion 122 of the antenna coil portion 120 and a second conductor pattern 132 provided on the back surface and connected to the second electrode portion 112b. The first conductor pattern 131 provided on the front surface is formed to include a plurality of comb-teeth conductor patterns. The second conductor pattern 132 provided on the back surface is formed to orthogonally intersect the comb-teeth portions. Charge is accumulated at each of the intersections. The adjustment capacitor 130 has a small capacitance compared to the capacitor 112. The adjustment capacitor 130 increases the resonant frequency by cutting off some of the comb-teeth conductor patterns to reduce the condenser capacitance during adjustment of the resonant frequency in a contactless IC card manufacturing process.

The configuration described so far is similar to that of the contactless IC card according to the related art shown in FIGS. 12A and 12B.

In the embodiment, metal patterns 201, 202, and 203 are disposed on the base material forming the contactless communication medium 110. In the embodiment of FIG. 1A and 2, the metal patterns 201, 202, and 203 are disposed on the same surface of the base material as the surface on which the antenna coil portion 120 is formed, inside the antenna coil portion 120.

The metal patterns 201, 202, and 203 are formed from a conductive metal material such as a copper or aluminum foil, and are not electrically connected to other circuit components such as the antenna coil portion 120 and the capacitor 112. For example, the metal patterns 201, 202, and 203 may be made of the same metal material as the material of the conductor pattern forming the antenna coil portion 120, and may be formed at the same time as the antenna coil portion 120 is formed by etching or the like.

In the embodiment of FIGS. 1A and 2, the three metal patterns 201, 202, and 203 have the same size as each other, and are arranged in the vertical direction in the case where the contactless communication medium 110 is a horizontally long card. A straight gap with a relatively narrow width of about 1 mm is provided between the three metal patterns 201, 202, and 203.

The metal patterns 201, 202, and 203 are disposed on the front surface of the base material inside the innermost turn of the antenna coil portion 120 and in a region other than regions in which the IC chip 111, the capacitor 112, and the adjustment capacitor 130 are disposed to occupy as large an area as possible.

That is, in the embodiment, as shown in FIG. 1A, the IC chip 111, the capacitor 112, and the adjustment capacitor 130 are disposed in a left corner region inside the pattern forming the antenna coil portion 120. Then, the three metal patterns 201, 202, and 203 are disposed in a relatively large region extending from the approximate center to the right corner inside the pattern forming the antenna coil portion 120.

With the presence of the three metal patterns 201, 202, and 203, in the case where the contactless IC card is brought into proximity to a reader/writer, most of an antenna of the reader/writer overlaps the metal patterns 201 to 203. That is, most of the antenna of the reader/writer, which is generally smaller than the antenna of the IC card, overlaps the metal patterns 201 to 203 during contactless proximity communication.

A reader/writer antenna position 300 indicated by the phantom line in FIG. 1A indicates the position of the antenna of the reader/writer in the case where the contactless IC card according to the embodiment is brought into proximity to the approximate center of the reader/writer. The metal patterns 201 to 203 are thus positioned to overlap the antenna of the reader/writer.

Figure 1B:
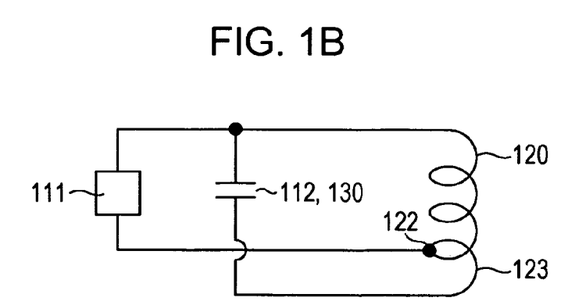
FIG. 1B shows a circuit that is equivalent to the configuration of the contactless communication medium of FIG. 1A.

FIG. 1B shows a circuit that is equivalent to the circuit of the contactless communication medium 110 shown in FIGS. 1A and 2. The equivalent circuit is basically the same as the equivalent circuit shown in FIG. 12B.

As shown in FIG. 1B, the IC chip 111 is connected to the antenna coil portion 120, and the capacitor 112 and the adjustment capacitor 130 are connected to the antenna coil portion 120 via the extension portion 123. The second end portion 122, at which the antenna coil portion 120 and the extension portion 123 are connected to each other, serves as an intermediate tap.

[2. Exemplary Overall Configuration]

Next, an exemplary overall configuration of a contactless IC card including the contactless communication medium 110 described so far will be described.

Figure 3:
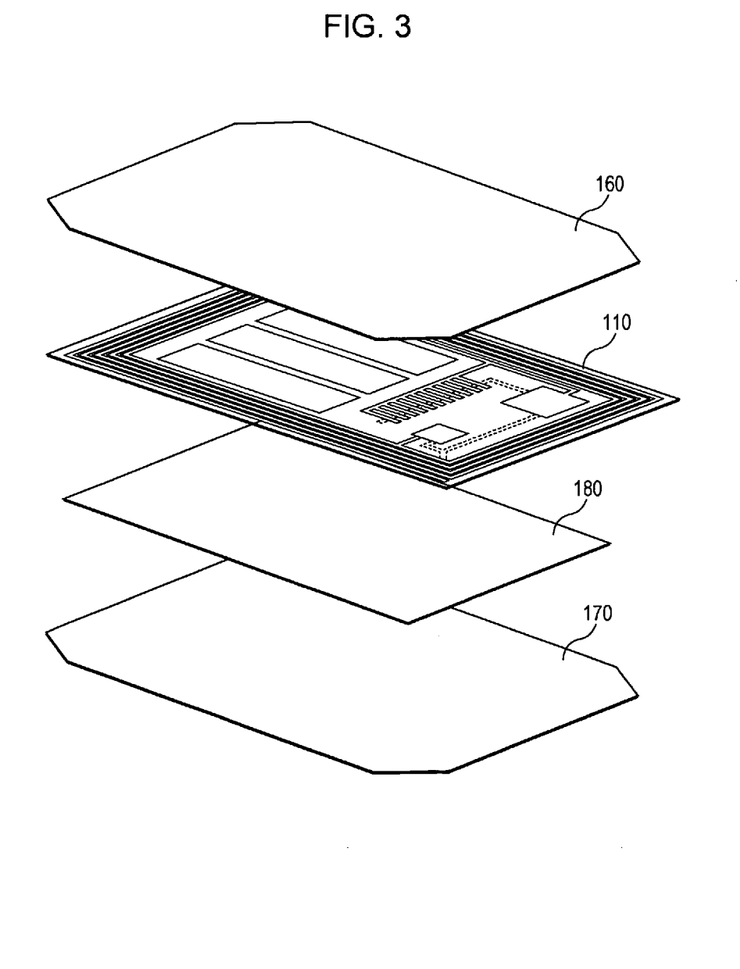
FIG. 3 is an exploded perspective view showing the overall configuration of the contactless communication medium according to the embodiment of the present invention.

FIG. 3 shows the overall contactless IC card in an exploded state. In the contactless IC card, an outer shell material 160 is disposed on the front surface 110a of the contactless communication medium 110. Although the outer shell material 160 is formed by a relatively thick resin material in the embodiment, the outer shell material 160 may be formed by a thin resin sheet.

A magnetic sheet 180 and an adhesive sheet 170 are sequentially disposed on the back surface 110b of the contactless communication medium 110, and integrated with each other to be assembled into a contactless IC card.

The magnetic sheet 180 is a sheet formed by a magnetic material. The magnetic sheet 180 may be a sheet formed by mixing magnetic powder with a high magnetic permeability into a resin material such as a polymer material, for example.

The adhesive sheet 170 provided on the back surface 110b facilitates attaching the contactless IC card to other electronic devices to be assembled into a communication apparatus.

Figure 4:
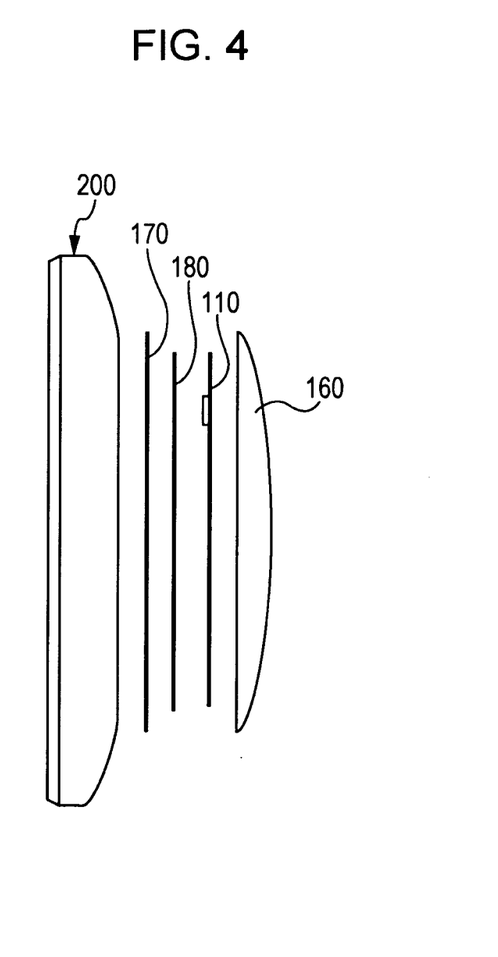
FIG. 4 is an exploded side view showing the contactless communication medium according to the embodiment of the present invention assembled to a terminal device.

That is, as shown in FIG. 4, for example, the contactless IC card according to the embodiment may be affixed to the back surface of a terminal device 200 such as a cellular phone terminal, a smart phone, an information terminal, or an audio/video playing device to form a communication apparatus with a contactless communication function. In this case, the presence of the magnetic sheet 180 allows the contactless IC card to favorably perform contactless communication without interference by circuit components in the terminal device 200 when the contactless IC card is brought into proximity to a reader/writer (not shown) to perform contactless communication.

Specifically, with the magnetic sheet 180 disposed in proximity to the antenna coil portion 120, magnetic flux from the reader/writer concentrates on the magnetic sheet 180 during contactless wireless communication, which improves the state of transmission and reception performed by the antenna coil portion 120 disposed adjacent to the magnetic sheet 180. In particular, with the contactless IC card affixed to the terminal device 200 which is separate from the card as shown in FIG. 4, the presence of a relatively large metal component is highly likely to degrade the transmission/reception performance of the antenna coil portion 120 because of the influence of the metal component. With the magnetic sheet 180 disposed between the antenna coil portion 120 and the terminal device 200, magnetic flux concentrates on the magnetic sheet 180 to prevent a reduction in wireless communication sensitivity due to the influence of the terminal device 200.

Further, in the case of the embodiment, as shown in FIGS. 1A and 2, the metal patterns 201, 202, and 203 are disposed inside the antenna coil portion 120 to further improve the wireless communication characteristics.

[3. Characteristics of Medium According to Embodiment]

Next, improvement in wireless communication characteristics achieved by the contactless IC card according to the embodiment will be described.

Figure 5:
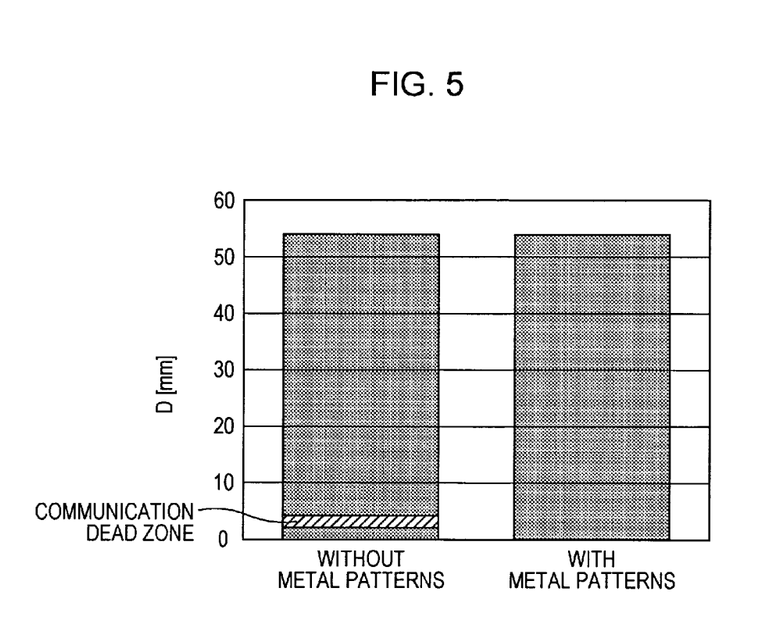
FIG. 5 shows exemplary communication distance characteristics according to the embodiment of the present invention.

FIG. 5 shows a comparison between the characteristics (on the right side of FIG. 5) of the contactless IC card (with the metal patterns 201 to 203) according to the embodiment and the characteristics (on the left side of FIG. 5) of a contactless IC card with no metal patterns (according to the example of FIG. 12A).

In FIG. 5, the vertical axis indicates the distance D [mm] from the reader/writer to the contactless IC card, and a range in which the correct communication response rate is 100% is defined as a communicable range.

As shown in FIG. 5, in either case, communication is possible in a range in which the distance D is up to more than 50 mm. In the case of the contactless IC card with no metal patterns, however, there is a communication dead zone in which the correct communication response rate is less than 100% in a range in which the distance D is several millimeters.

In the case of the contactless IC card with the metal patterns 201 to 203 according to the embodiment, in contrast, there is no communication dead zone in a range in which the correct communication response rate is 100%, which allows reliable communication if the distance between the reader/writer and the contactless IC card is from 0 mm to about 50 mm. Thus, according to the configuration of the embodiment, the wireless communication performance is improved over the related art.

This effect is attributable to the fact that the antenna of the reader/writer is relatively small and overlaps the metal patterns 201 to 203 as indicated by the reader/writer antenna position 300 shown in FIG. 1A.

The effect shown in FIG. 5 may be obtained both in the case where the magnetic sheet 180 shown in FIG. 3 is provided and in the case where no such magnetic sheet 180 is provided.

[4. First Modification]

Figure 6:
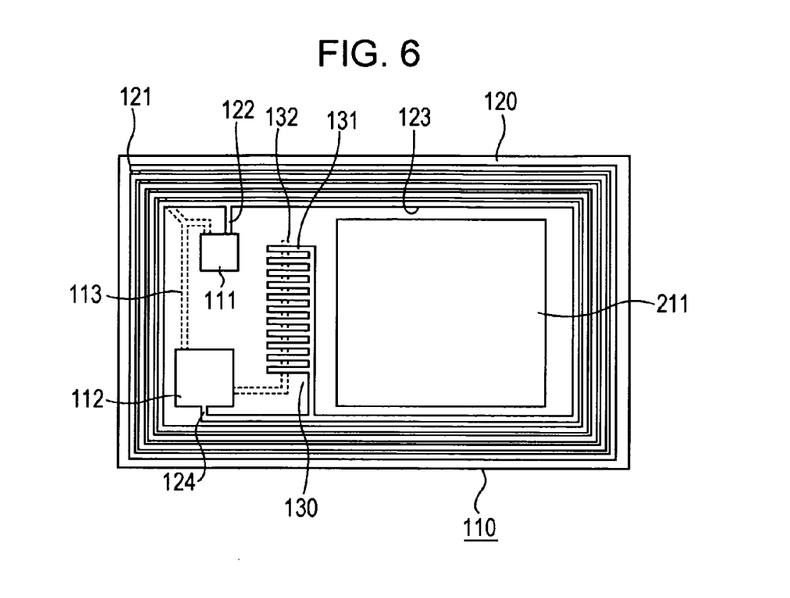
FIG. 6 is a plan view showing another example (a first modification with a single metal pattern) of the contactless communication medium according to the embodiment of the present invention.

FIG. 6 shows a first modification of the embodiment. In FIG. 6, components corresponding to those in FIGS. 1A and 2 are denoted by the same reference numerals.

In the modification of FIG. 6, a single metal pattern with a large area is disposed on the base material on which the antenna coil portion 120 is disposed to serve as a metal pattern 211.

That is, the single metal pattern 211 is disposed on the front surface of the base material inside the innermost turn of the antenna coil portion 120 and in a region other than regions in which the IC chip 111, the capacitor 112, and the adjustment capacitor 130 are disposed to occupy as large an area as possible.

In the modification of FIG. 6, the area of the single metal pattern 211 is substantially the same as the total of the areas of the three metal patterns 201 to 203 in the embodiment of FIG. 1A.

Although not shown, the wireless communication characteristics according to the modification of FIG. 6 are substantially the same as the characteristics of the contactless IC card with no metal patterns shown in FIG. 5.

[5. Second Modification]

Figure 7:
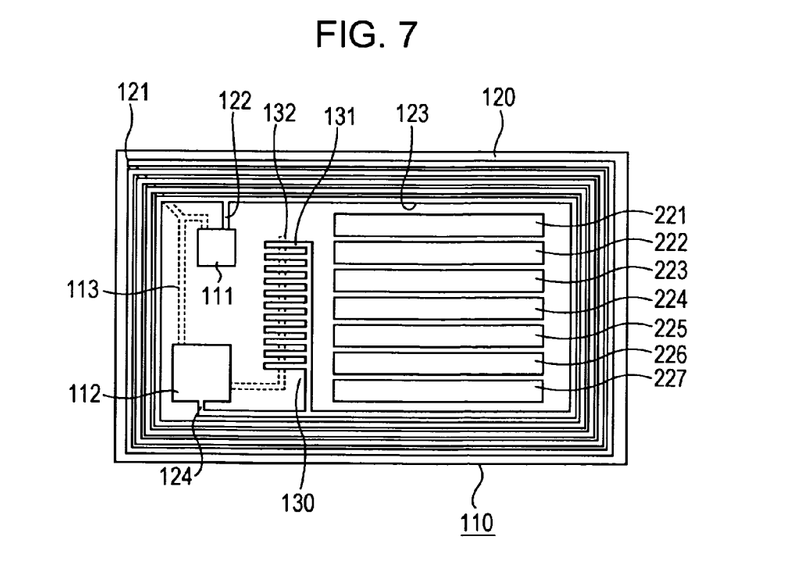
FIG. 7 is a plan view showing another example (a second modification with an increased number of divided metal patterns) of the contactless communication medium according to the embodiment of the present invention.

FIG. 7 shows a second modification of the embodiment. In FIG. 7, components corresponding to those in FIGS. 1A and 2 are denoted by the same reference numerals.

In the modification of FIG. 7, seven metal patterns divided in the vertical direction are disposed on the base material on which the antenna coil portion 120 is disposed to serve as metal patterns 221 to 227.

That is, the seven metal patterns 221, 222, 223, . . . , and 227 divided in the vertical direction in case of a horizontally long card are disposed on the front surface of the base material inside the innermost turn of the antenna coil portion 120 and in a region other than regions in which the IC chip 111, the capacitor 112, and the adjustment capacitor 130 are disposed.

In the modification of FIG. 7, the total of the areas of the seven metal patterns 221 to 227 is substantially the same as the total of the areas of the three metal patterns 201 to 203 in the embodiment of FIG. 1A.

Figure 8A:
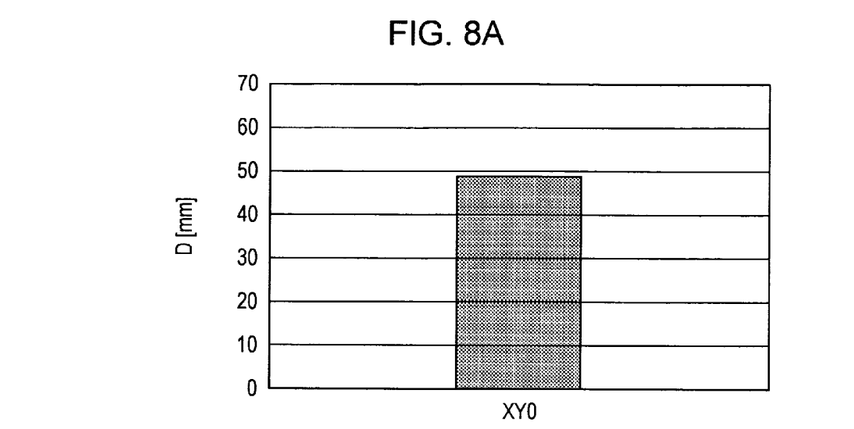
FIG. 8A shows exemplary communication distance characteristics according to the modification of FIG. 7.
Figure 8B:
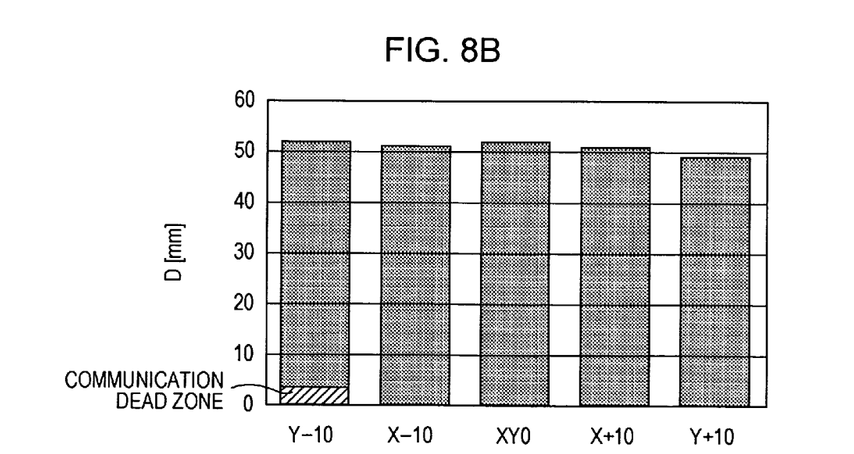
FIG. 8B shows exemplary communication distance characteristics according to the modification of FIG. 7.

FIGS. 8A and 8B show the wireless communication characteristics according to the modification of FIG. 7.

FIG. 8A shows the characteristics for a case where the contactless IC card is disposed at the center of an antenna of a reader/writer. In FIG. 8A, the vertical axis indicates the distance D [mm] from the reader/writer to the contactless IC card, and a range in which the correct communication response rate is 1001 is defined as a communicable range.

As shown in FIG. 8A, wireless communication may be made over a distance that is substantially the same as with the characteristics shown in FIG. 5, and there is no dead zone.

FIG. 8B shows the characteristics for cases where the contactless IC card is shifted in X and Y directions from the center of the antenna of the reader/writer. The X and Y directions are orthogonal to each other.

In FIG. 8B, the bar indicated as XY0 corresponds to a case where the card is disposed at the center of the reader/writer. The graph also shows bars corresponding to cases where the card is displaced by +10 mm and −10 mm in the X direction (respectively indicated as X+10 and X−10) and by +10 mm and −10 mm in the Y direction (respectively indicated as Y+10 and Y−10).

Substantially no variations are observed in the characteristics even if the card is displaced except for the case where the card is shifted by −10 mm in the Y direction, in which case there is a slight dead zone in a range in which the distance D from the reader/writer to the card is several millimeters.

Thus, the configuration according to the modification of FIG. 7 also provides favorable wireless communication characteristics.

[6. Third Modification]

Figure 9:
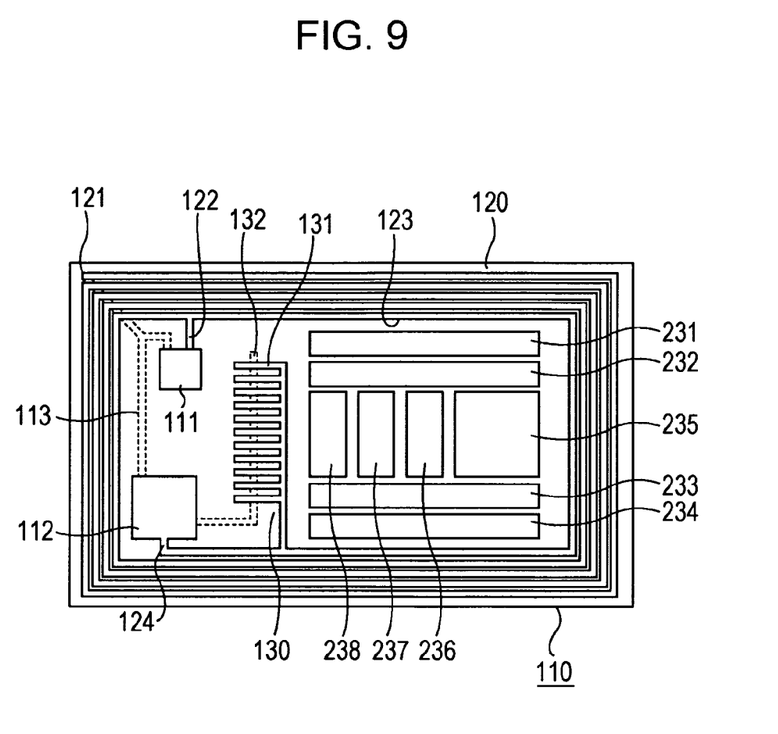
FIG. 9 is a plan view showing another example (third modification with metal patterns divided in two directions) of the contactless communication medium according to the embodiment of the present invention.

FIG. 9 shows a third modification of the embodiment. In FIG. 9, components corresponding to those in FIGS. 1A and 2 are denoted by the same reference numerals.

In the modification of FIG. 9, four metal patterns 231 to 234 divided in the vertical direction and four metal patterns 235 to 238 divided in the horizontal direction are disposed on the base material on which the antenna coil portion 120 is disposed to serve as metal patterns 231 to 238.

That is, the four metal patterns 231, 232, 233, and 234 divided in the vertical direction in case of a horizontally long card are disposed on the front surface of the base material inside the innermost turn of the antenna coil portion 120 and in a region other than regions in which the IC chip 111, the capacitor 112, and the adjustment capacitor 130 are disposed. A space is provided between the metal pattern 232 and the metal pattern 233. Then, the four metal patterns 235, 236, 237, and 238 divided in the horizontal direction, which is orthogonal to the vertical direction, are disposed in the space between the metal patterns 232 and 233.

In this case, of the four metal patterns 235, 236, 237, and 238 divided in the horizontal direction, the metal pattern 235 on the rightmost side has a larger area, and the three remaining metal patterns 236, 237, and 238 have the same area which is smaller than the area of the metal pattern 235. The metal patterns 231, 232, 233, and 234 divided in the vertical direction have the same area as each other.

Figure 10A:
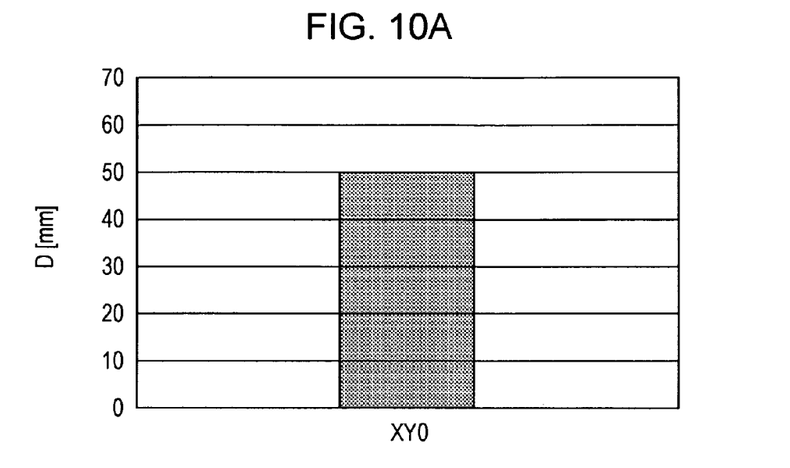
FIG. 10A shows exemplary communication distance characteristics according to the modification of FIG. 9.
Figure 10B:
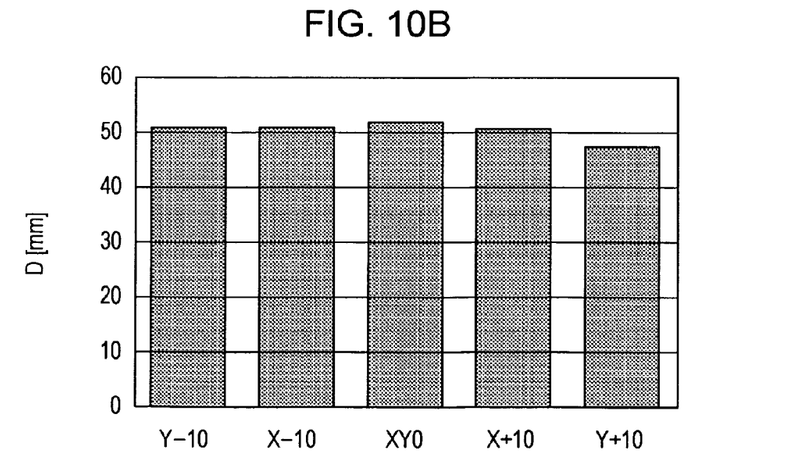
FIG. 10B shows exemplary communication distance characteristics according to the modification of FIG. 9.

FIGS. 10A and 10B show the wireless communication characteristics according to the modification of FIG. 9.

FIG. 10A shows the characteristics for a case where the contactless IC card is disposed at the center of an antenna of a reader/writer. In FIG. 10A, the vertical axis indicates the distance D [mm] from the reader/writer to the contactless IC card, and a range in which the correct communication response rate is 100% is defined as a communicable range.

As shown in FIG. 10A, wireless communication may be made over a distance that is substantially the same as with the characteristics shown in FIG. 5, and there is no dead zone.

FIG. 10B shows the characteristics for cases where the contactless IC card is shifted in X and Y directions from the center of the antenna of the reader/writer. The X and Y directions are orthogonal to each other.

In FIG. 10B, the bar indicated as XY0 corresponds to a case where the card is disposed at the center of the reader/writer. The graph also shows bars corresponding to cases where the card is displaced by +10 mm and −10 mm in the X direction (respectively indicated as X+10 and X−10) and by +10 mm and −10 mm in the Y direction (respectively indicated as Y+10 and Y−10).

In the configuration according to the modification of FIG. 9, as seen from FIG. 10B, there is no dead zone at all even if the card is shifted.

Thus, the configuration according to the modification of FIG. 9 also provides favorable wireless communication characteristics. In particular, favorable characteristics are secured to a degree even if the card is shifted from the center of the reader/writer to some degree.

[7. Other Modifications]

The embodiment shown in FIG. 1A and the modifications are formed by providing metal patterns in a circuit configuration with a so-called intermediate tap (the configuration shown in FIGS. 12A and 12B). On the contrary, metal patterns may also be provided in the configuration with no intermediate tap shown in FIGS. 11A and 11B, inside the antenna coil portion.

In addition, although the metal patterns are disposed on the same surface as the surface on which the antenna coil portion is disposed in the embodiment and the modifications, the antenna coil portion and the metal patterns may be disposed on the front surface and the back surface, respectively, of the base material.

Further, the metal patterns may be disposed on a sheet that is separate from the base material on which the antenna coil portion is disposed as long as the metal patterns are disposed inside the antenna coil portion as the resulting IC card is seen in plan (that is, in the state shown in FIG. 1A, etc.). It should be noted, however, that the sheet with the metal patterns is preferably disposed between the base material forming the contactless communication medium 110 and the magnetic sheet 180, or between the base material forming the contactless communication medium 110 and the outer shell material 160, when illustrated with reference to FIG. 3. If the sheet with the metal patterns is disposed on the outer side (lower side in FIG. 3) of the magnetic sheet 180, improvement in communication performance is not expected.

It should be understood by those skilled in the art that various modifications, combinations, sub-combinations and alterations may occur depending on design requirements and other factors insofar as they are within the scope of the appended claims or the equivalents thereof.

What is claimed is:

1. A contactless communication medium comprising:
   a base material made of an insulating material;
   an antenna coil portion formed by winding a conductor in a plane on one side of the base material;
   a communication processing section connected to the antenna coil portion to perform a contactless communication process;
   a metal pattern having a predetermined area, and disposed on the base material in a first region surrounded by the antenna coil portion, the metal pattern being not electrically connected to the antenna coil portion or the communication processing section, the metal pattern not passing through the one side of the base material to other side thereof, wherein the metal pattern comprises:
      a plurality of second metal patterns arranged side by side in a first direction in the first region surrounded by the antenna coil portion, and
      a plurality of third metal patterns arranged side by side in a second direction that is orthogonal to the first direction,
      wherein each of the plurality of second metal patterns and each of the plurality of third metal patterns are not electrically connected to each other; and a magnetic sheet disposed on the other side of the base material.

2. The contactless communication medium according to claim 1, wherein the magnetic sheet has at least the same size as the base material and is disposed to overlap the base material.

3. The contactless communication medium according to claim 1, further comprising:
   a capacitor connected to the antenna coil portion, and the metal pattern being not electrically connected to the capacitor.

4. The contactless communication medium according claim 3, wherein the communication processing section operates on electric power received by the antenna coil portion and accumulated in the capacitor.

5. An antenna coil arrangement comprising:
   a base material made of an insulating material;
   an antenna coil portion formed by winding a conductor in a plane on one side of the base material;
   a metal pattern having a predetermined area, and disposed on the base material in a first region surrounded by the antenna coil portion and in which a communication processing section for connection to the antenna coil portion is also disposed, the metal pattern being not electrically connected to the antenna coil portion or the communication processing section, the metal pattern not passing through the one side of the base material to other side thereof, wherein the metal pattern comprises:
      a plurality of second metal patterns arranged side by side in a first direction in the first region surrounded by the antenna coil portion, and
      a plurality of third metal patterns arranged side by side in a second direction that is orthogonal to the first direction,
      wherein each of the plurality of second metal patterns and each of the plurality of third metal patterns are not electrically connected to each other; and
      a magnetic sheet disposed on the other side of the base material.

6. A communication apparatus comprising:
   an antenna coil portion formed on one side of a base material made of an insulating material by winding a conductor in a plane on the base material;
   a communication processing section connected to the antenna coil portion to perform a contactless communication process;
   a metal pattern having a predetermined area, and disposed on the base material in a first region surrounded by the antenna coil portion, the metal pattern being not electrically connected to the antenna coil portion or the communication processing section, the metal pattern not passing through the one side of the base material to other side thereof, wherein the metal pattern comprises:
      a plurality of second metal patterns arranged side by side in a first direction in the first region surrounded by the antenna coil portion, and
      a plurality of third metal patterns arranged side by side in a second direction that is orthogonal to the first direction,
      wherein each of the plurality of second metal patterns and each of the plurality of third metal patterns are not electrically connected to each other; and
      a magnetic sheet disposed on the other side of the base material.

7. The communication apparatus according to claim 6, wherein the magnetic sheet is between the antenna coil portion and a main body of the communication apparatus.

8. The communication apparatus according to claim 6, wherein the metal pattern is made of one or more metal foils.

9. The communication apparatus according to claim 6, wherein the metal pattern is disposed at the same side of the base material as the plane forming the antenna coil portion.

10. The communication apparatus according to claim 6, wherein the metal pattern is disposed at the opposite side of the base material as the plane forming the antenna coil portion.

11. The communication apparatus according to claim 6, wherein the metal pattern is composed of a combination of a plurality of square-figured metals.

\* \* \* \* \*